United States Patent [19]

Williamson et al.

[11] Patent Number: 4,799,697
[45] Date of Patent: Jan. 24, 1989

[54] APPARATUS FOR MANUALLY MOVING LOADS

[76] Inventors: Calvin C. Williamson; Joan Williamson, both of 1690 River Park Blvd., Napa, Calif. 94558

[21] Appl. No.: 919,655

[22] Filed: Oct. 16, 1986

Related U.S. Application Data

[63] Continuation-in-part of Ser. No. 775,416, Sep. 12, 1985.

[51] Int. Cl.$^4$ .............................................. B60K 9/00
[52] U.S. Cl. ..................................... 280/3; 280/218; 192/50; 188/82.2; 180/193
[58] Field of Search ............................. 180/19.1, 19.3; 280/475, 477, 218, 219, 151, 63, 3, 414.1; 188/82.1, 82.2; 74/157, 159; 192/43.1, 50

[56] References Cited

U.S. PATENT DOCUMENTS

| | | | |
|---|---|---|---|
| 233,892 | 11/1880 | Stewart et al. | 188/22 |
| 1,640,308 | 8/1927 | Becker | 188/22 |
| 2,560,704 | 7/1951 | Sebel | 188/30 |
| 2,613,083 | 10/1952 | Moludy | 280/42 |
| 3,276,550 | 10/1966 | Honeyman | 188/29 |
| 3,447,643 | 6/1969 | Ulbing | 188/82.2 |
| 3,902,576 | 9/1975 | Pitan et al. | 188/82.7 |
| 4,227,706 | 10/1980 | Morris | 280/3 |
| 4,416,460 | 11/1983 | Morris | 280/3 |
| 4,431,208 | 2/1984 | Geeves | 280/475 |

OTHER PUBLICATIONS

"Meet the Maro Traction Wheel" Maro Mule U.S. Inc., P.O. Box 405, Falls Station Niagara Falls, NY 14303.

*Primary Examiner*—John J. Love
*Assistant Examiner*—Richard Lamby
*Attorney, Agent, or Firm*—Burns, Doane, Swecker & Mathis

[57] ABSTRACT

Apparatus to reduce the force required to move a load along a flat or inclined surface utilizing an assembly of two traction wheels on a common axis whereby one wheel is free to rotate and the other is prevented from rotation and vice versa by the use of a uni-directional control arm system and means for applying a horizontal oscillating force in alternating left and right hand directions in the form of a relatively long handle attached to the axle housing midway between said traction wheels. The wheel assembly is particularly useful for trailers for carrying animals, small boats, recreational vehicles, two-wheeled hand trucks and similar applications.

14 Claims, 4 Drawing Sheets

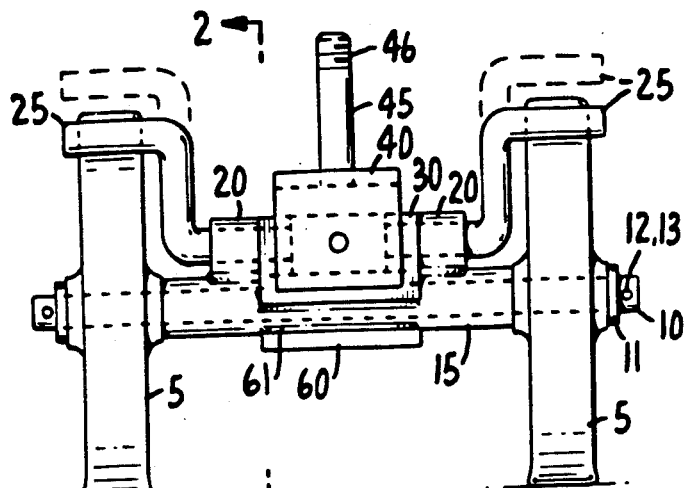
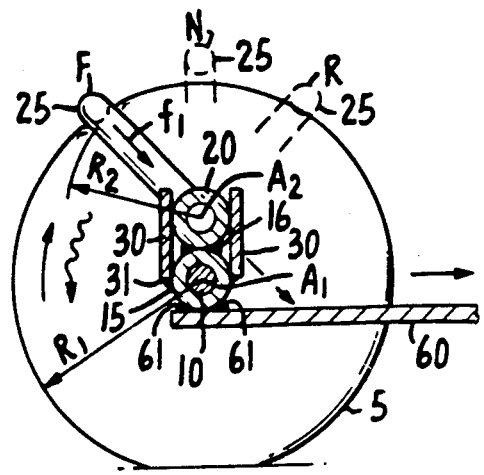
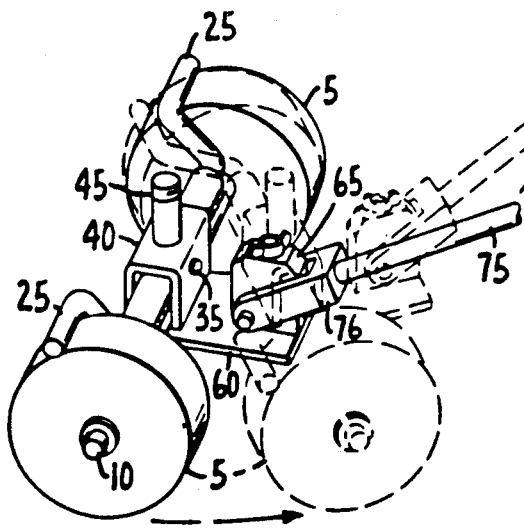
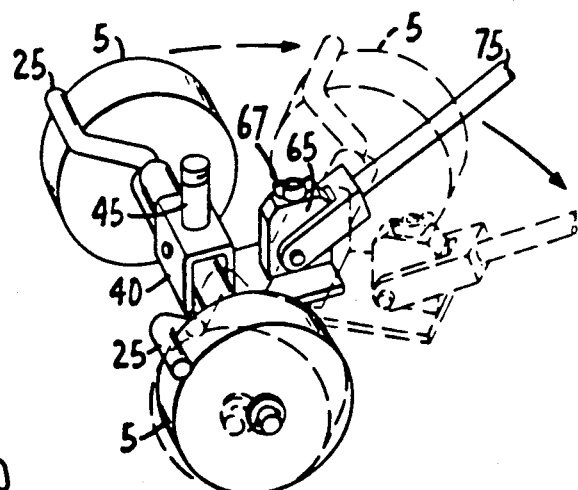
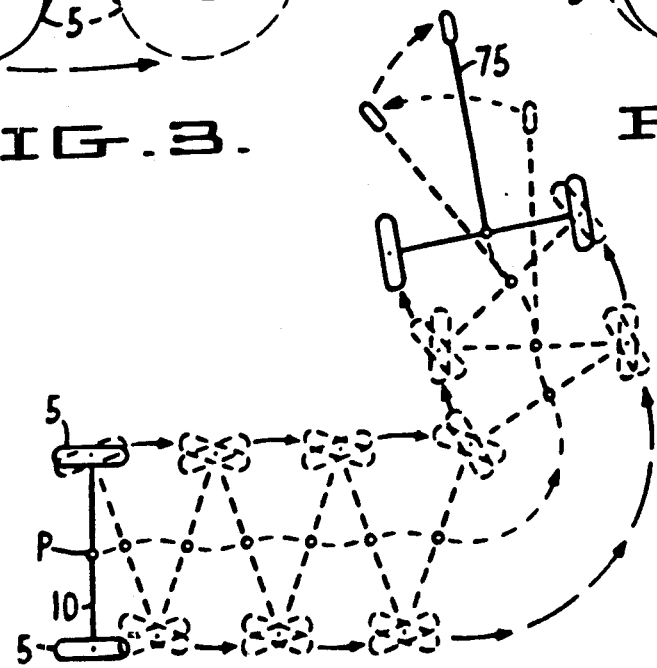

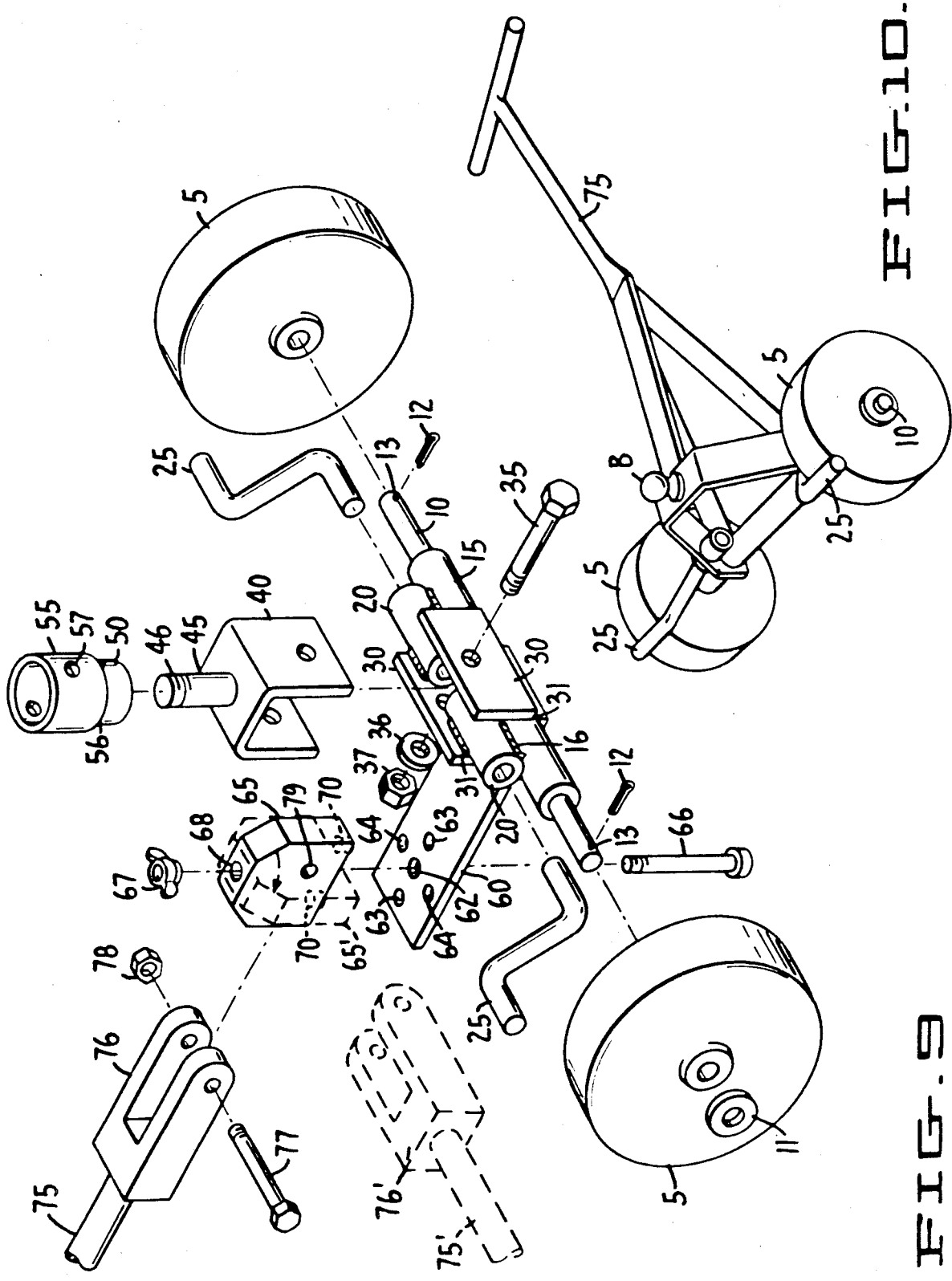

APPARATUS FOR MANUALLY MOVING LOADS

This application is a continuation-in-part of U.S. application Ser. No. 775,416, filed Sept. 12, 1985, entitled "APPARATUS FOR MANUALLY MOVING LOADS" wherein Calven C. Williamson and Joan Williamson are applicants.

FIELD OF THE INVENTION

This invention relates to an apparatus for movement of loads by use of an apparatus comprising a wheel assembly having a wheel mounted at opposite ends of a common axle and means for controlling rotation of the wheels in a forward or reverse direction. Such wheels can be prevented from rotation in one direction while remaining free to rotate in the opposite direction when a horizontal oscillating or sweeping motion is applied to a long handle attached to the wheel assembly thereby creating a force to move a given load when a vertical trailer jack post or other such device is pivotally attached to the assembly midway between the wheels.

BACKGROUND OF THE INVENTION

Trailers for transportation of animals, boats, and equipment generally are equipped with a vertically adjustable jack on which is attached a pivotable caster-type wheel upon which part of the trailer load is supported near the tongue or hitching device. The caster-type wheel is intended to make it possible to move the trailer by applying physical force manually to position the trailer hitch over the mating device on the towing vehicle then lowering the jack to engage the hitching device.

Heavy loads are sometimes difficult or impossible to manually maneuver into position for hitching to the towing vehicle or to manipulate the trailer into difficult positions for storage after it has been disengaged from the hitch, particularly when attempted by only one person. Usually, when it is difficult or impossible to manually maneuver the trailer into position, the driver of the towing vehicle will instead attempt to maneuver the towing vehicle hitch to position it accurately with respect to the trailer hitch or to move the trailer into a stored position by use of the towing vehicle. Such maneuvering requires a great deal of skill and often requires several attempts before it can be positioned accurately enough, and at best is risky, often resulting in damage to the towing vehicle or the trailer. Numerous bodily injuries have also resulted from attempting to move such heavy loads.

The object of this invention is to enable conventional heavy rolling apparatus to be moved and otherwise maneuvered on flat and inclined surfaces by means of leverage with much less manual effort than is normally required for manual movement of mobile equipment. Such conventional devices include trailers for transporting animals, small boats, mobile homes, recreational and utility trailers, and other types of two-wheel and tandem four-wheel trailers normally pulled by automobiles and small trucks.

The invention is also applicable to the two-wheel hand trucks of the type used in industrial warehouses for barrel handling and the like, in department stores, and for similar operations where heavy loads must be moved manually up inclined ramps to loading platforms or up portable ramps to load trucks and trailers.

Also, the invention is useful with four-wheel warehouse truck platforms having two wheels on one end of a truck which are of the non-swivel (caster) type and two wheels on the opposite end which are swivel caster type, as well as hand operated pallet lift trucks, and with two-wheel type wheelbarrows such as used in the construction industry where it is necessary to move heavy loads up inclined ramps and the like.

This invention is particularly useful for one person to manually manipulate trailers into position, for attaching the trailer hitch to a vehicle for towing, and for manipulating a trailer into and out of areas that are difficult to maneuver in by other means.

SUMMARY OF THE INVENTION

This invention is applicable to any apparatus intended for movement by alternately rotating one of two wheels and wherein such wheels can be prevented from rotating in one direction while remaining free to rotate in the opposite direction.

In two wheel apparatus it is often necessary to reverse the direction of motion or to move freely in either direction. The present invention provides means to prevent wheel rotation in a forward direction while the wheels remain free to rotate in the reverse direction; or to prevent rotation of wheels in a reverse direction while remaining free to rotate in the forward direction when a horizontal oscillating force is applied to a relatively long handle or lever arm connected to the assembly, or to allow free rotation of the wheels in either direction when it is easier or faster to so move the apparatus.

This invention is useful for the forward or reverse movement of any vehicle adapted for towing by applying leverage to a handle attached to a pair of wheels spaced apart and mounted on a common axle. Each wheel is equipped with a uni-directional control device so that when leverage is horizontally applied to the axle in alternative directions, one wheel is prevented from moving backward while the other is free to move forward and visa versa, thereby causing the axle upon which the wheels are attached to move forward. When the uni-directional devices are positioned to prevent rotation of the wheels in the opposite direction of that just described, application of alternating horizontal leverage will cause the wheels to rotate in the opposite direction thereby causing the axle to which the wheels are attached to move in the opposite direction.

If a vertical pivot shaft is attached to the axle housing of the invention midway between the wheels and the pivot shaft attached to the end of the jack post on the trailer to replace the conventional caster-type wheel, the trailer can be easily manipulated in any desired direction by alternately applying horizontal leverage to the axle. Leverage is applied to the axle by means of a handle connected to it. The handle is so connected by a horizontal pivot pin and can be raised or lowered to the most suitable position for movement. It can also be adjusted so that it can be operated from either side so as not to interfere with the towing vehicle. When the handle is forced alternately from side to side in a horizontal motion, a force is imparted to the jack post of the trailer causing the trailer to move in a forward or reverse direction depending upon the position in which the uni-directional control arms or levers are set. The amount of leverage required at the end of the lever arm is proportional to the center distance of the wheels and the length of the lever arm or handle.

When it is easy to move the load without imparting leverage to the axle, the uni-directional control arms can be set in a neutral position so both wheels are free to rotate in either direction. In this position, the trailer can be pushed or pulled freely while using the lever handle to steer with.

While moving of a trailer is used to describe one application of the invention, the invention is also applicable to other two-wheeled devices such as industrial hand trucks, two-wheeled construction-type wheel barrows, drum handling hand trucks, pallet lift trucks and other applications where heavy loads must be moved up inclined ramps.

There are several means for achieving unidirectional rotation wherein rotation of a wheel in one direction is prevented while the wheel is permitted to rotate freely in the opposite direction. It is not intended to limit this invention to any particular uni-directional rotation braking system, various advantageous systems that are simple and inexpensive are described herein and depicted in the drawings. On such system in its simplest form is described below.

BRIEF DESCRIPTION OF THE DRAWINGS

FIG. 1 is a side elevation of a pair of wheels mounted on an axle arrangement with a unidirectional control arm mounted thereon for operation of the invention.

FIG. 2 is an end view of one of the wheel and axle arrangements of FIG. 1 taken along the line 2—2 of FIG. 1.

FIG. 3 is a perspective view partly in section of the wheel and axle arrangement showing the operation of the control arm when one wheel is free to rotate and the other is prevented from rotating in the same direction;

FIG. 4 is a perspective view partly in section showing the opposite wheel and control arm when it is free to rotate while rotation of the other wheel is frozen;

FIG. 5 is a top view of the typical path of travel of an assembly arrangement as shown in FIGS. 3 and 4 when in use;

FIG. 9 is an exploded view in perspective displaying all of the individual components of the invention in respect to each other.

FIG. 10 is a perspective view of a trailer moving device equipped with a ball for engagement to a trailer hitch as commonly used to move trailers manually in storage yards and marinas.

DETAILED DESCRIPTION OF THE PREFERRED EMBODIMENT

Figure 8:
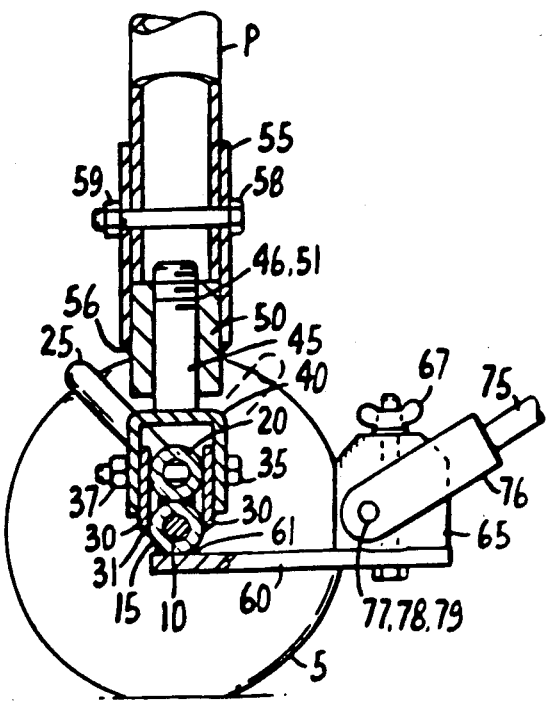
FIG. 8 is a fragmentary view partly in section of an assembly of FIG. 7 and is taken along the lines 8—8 thereof when looking in the direction of the arrows.

In referring to the drawings, it will be noted that one embodiment of the present invention assembly in its simplest form consists of a wheel 5 mounted on each end of an axle 10. Wheel 5 is retained thereon by washer 11 and cotter pin 12 which is passed through hole 13 drilled in the ends of axle 10. Axle 10 is enclosed within tubular housing 15. Tubular control arm support brackets 20 having axes in vertical alignment with axle 10 are connected to tubular axle housing 15 by welds 16. One end of each of the crank shaped uni-directional control arms 25 pivots within support brackets 20. Additional pivot brackets 30 are attached by welds 31 at the bottom edges of brackets 30 to each side of axle housing 15 and control arm support brackets 20 midway between the ends of axle housing 15. Pivot bolt 35 passes through holes in pivot brackets 30 and inverted U-shaped bracket 40 and is secured in position by nut 37, thus providing a pivotable means for connecting axle housing 15 to pivot bracket 40. Pivot bracket 40 is an inverted U-shaped member to which is attached vertical pivot pin 45 desirably in the center of the base of the inverted U. The upper end of pivot pin 45 has threads 46 which engage with threads 51 in the top of the vertical hole or opening in vertical pivot bearing 50 to support vertical forces from jack post P. The shaft 45 and threads 46 of vertical pivot pin 45 may be hardened and fit closely within vertical pivot bearing 50 and threads 51 to permit easy rotation of pin 45 within bearing 50. Vertical pivot bearing 50 is attached to tubular socket 55 by welds 56 or equivalent means. Holes 57 are drilled through walls of tubular socket 55 for attachment to jack post P on trailer T by bolt 58 and nut 59 (See FIG. 8).

Bracket 60 in the form of a flat plate is attached to the underside of axle housing 15 by welds 61. Holes 62, 63 and 64 are drilled in the other end of bracket 60 for attaching operating handle bracket 65 by bolt 66 and wing nut 67. Dowel pins 70 shown in outline (See FIG. 9) are inserted in and protrude from the bottom of operating handle bracket 65 in alignment with holes 63 in bracket 60, so that when bracket 65 is engaged with holes 63 in bracket 60, bracket 65 and bracket 60 remain fixed and do not rotate when leverage is applied horizontally by handle 75. Handle clevis 76 is attached to operating handle eye bracket 65 by pivot bolt 77 and nut 78 through hole 79 in eye bracket 65.

When eye bracket 65 is secured to bracket 60 by bolt 66 and wing nut 67 with dowel pins 70 inserted in holes 63 in bracket 60, the assembly may be operated from the front handle 75. When operating handle eye bracket 65 is secured to bracket 60 with dowel pins 70 inserted into holes 64, the assembly may be operated from the side as shown in FIG. 9 by bracket position 65' and handle position 75'. To reposition bracket 65 to position 65', wing nut 67 is loosened to allow bracket 65 to be raised sufficiently so that dowel pins 70 clear the top surface of bracket 60 to allow eye bracket 65 to be rotated about 90 degrees in either direction so that dowel pins 70 align with holes 64 in which position wing nut 67 is tightened to secure operating handle bracket 65 to bracket 60 into side operating position 65'.

Jack post P is a conventional part of a trailer to which the present invention may be attached or a separate jack assembly may be used.

Wheels 5 may be lined on their outer surfaces with rubber or some other suitable resilient material to enhance proper gripping by friction between the control arm 25 and the outer surface of wheel 5.

OPERATING DESCRIPTION OF THE INVENTION

In FIG. 1, the uni-directional control arm 25 for both wheels 5 are shown in the 'F' or forward position. In FIG. 2, arm 25 is also shown in the forward or F position, and is shown in phantom lines 25 in the reverse 'R' position and the neutral 'N' position with arm 25 straight up. Position F designates the position of the control arm 25 when wheel 5 is restrained by arm 25 from rotating in a counterclockwise direction as indicated by the wavy arrowshaft (also FIG. 2), but is free to rotate in a clockwise direction as indicated by the clockwise arrow. Thus with control arm 25 in the F position, wheel 5 is free to move to the right in a forward direction while it is restrained from moving to the left in a reverse direction. Conversely, when control arm 25 is moved to the reverse R position, the wheel 5 may rotate freely in the counterclockwise direction but is restrained from moving in a clockwise direction. Thus, wheel 5 with control arm 25 in the R position is free to move horizontally to the left or reverse direction but is restrained from moving to the right or forward direction. When control arm 25 is moved to the neutral N position, arm 20 does not contact wheel 5. Therefore wheel 5 is free to rotate in either direction, i.e., clockwise or counterclockwise, therefore, with control arm 25 in the N position the wheel 5 is free to move in the forward and reverse directions.

It will be noted that control arm 25 which rotates about axis $A_2$ in FIG. 2, has a radius $R_2$ which is less than wheel 5 radius $R_1$ rotating about axis $A_1$ of axle 10. The friction of that part of control arm 25 surface in contact with the surface of wheel 5 causes control arm 25 to grip the outer surface of wheel 5 and to rotate counterclockwise in the same direction as wheel 5 rotates when arm 25 is in the F position. As rotation continues in the counterclockwise direction, control arm 25 exerts a force $f_1$, which line of force is above wheel 5 axis $A_1$ (see FIG. 2) that produces a clockwise reaction on wheel 5 to prevent further rotation of wheel 5 in a counterclockwise direction. However, when wheel 5 is rotated in a clockwise direction, the control arm 25 tends to rotate in a clockwise direction with wheel 5 until control arm 25 loses contact with the surface of wheel 5 or no longer restrains movement of wheel 5, thus allowing wheel 5 to rotate freely in the clockwise direction.

To cause wheel 5 to rotate freely to the left or counterclockwise direction and thus permit the assembly to move in the opposite direction as described above, control arm 25 is shifted to the R position at which position, all actions described above function similarly except that the frictional braking forces acting on the surface of wheel 5 by arm 25 are exerted in the opposite direction.

To cause wheel 5 to rotate freely in either direction, control arm 25 is moved to the N position in which position arm 25 does not contact wheel 5 surface. Thus, the control arm 20 can be shifted to either the F or R positions, respectively, as above described and therefore becomes a bi-directional control means for rotation of wheel 5.

Figure 6:
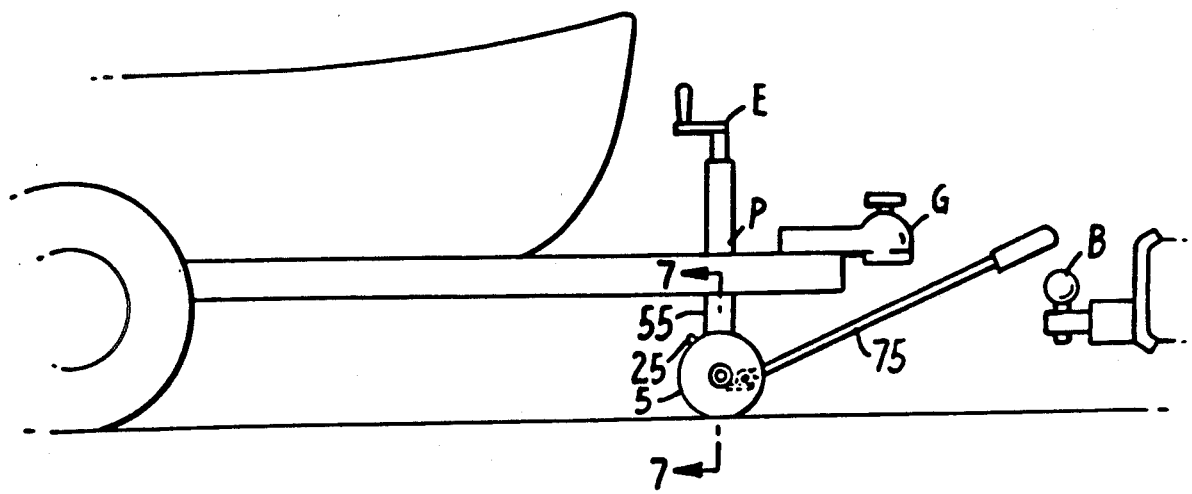
FIG. 6 is a view in side elevation showing the present invention when connected to a conventional trailer for hauling a small boat by a conventional trailer hitch arrangement.

Since a force must be applied to wheel 5 to cause it to move in a particular direction while preventing rotation of the wheel 5 in the opposite direction, the pair of wheels 5 which are mounted on common axle 10 and passes through tubular housing 15 separate the wheels 5 from each other by several inches as shown in the drawings. As described above, control arm tubular pivot brackets 20 are attached in vertical alignment by welds 16 to tubular axle housing 15. One end of crank-shaped control arm 25 pivots in the tubular pivot bracket 20 while the other end of the control arm 20 rotates freely about axis $A_2$ above the outer surface of wheel 5 between points of contact of control arm 25 and wheel 5 at positions designated F and R in FIG. 2. One end of a bracket 60 is welded to the underside of axle housing 15. Eye bracket 65 is pivotally attached by bolt 66 and wing nut 67 to the other end of bracket 60. Clevis 76 attached to the end of operating handle 75 is attached by bolt 77 and nut 78 through a hole 79 in eye bracket 65 to provide a convenient means of rotating operating handle 75 up or down to any desired position while enabling the handle 75 to be swung alternately left or right to apply leverage to the axle housing 15. U-shaped pivot bracket 40 is attached to the axle housing assembly by a bolt 35 which passes through holes in brackets 30 welded to both sides of axle housing 15 and secured in position by nut 37 and washer 36 to provide a convenient means for wheel 5 to traverse over uneven terrain as the assembly pivots on bolt 35 while pivot bracket 40 and vertical pivot pin 45 remain in vertical alignment with pivot bearing 50 and socket 55 which are attached to jack post P of a trailer, such as shown in FIG. 6.

Thus, it can be seen by observing the positions depicted in FIG. 3 that with both directional control arms 25 moved to the F position, when operating handle 75 is swung from the left to right as depicted by the arrow, the wheel 5 in the background will tend to move in the opposite direction from the handle but is prevented from doing so by control arm 25 as the wheel 25 in the foreground is free to rotate forward causing the whole assembly to move forward in the direction of the handle 75 while the whole assembly pivots about the wheel 5 in the background at its point of contact with the surface upon which both wheels 5 roll. When leverage is applied to handle 75 from right to left as shown in Fib. 4, the wheel 5 in the foreground is prevented from moving backward while the wheel 5 in the background is free to move forward in the direction of the handle 75 thus causing the whole assembly to continue in a forward motion.

When both control arms 25 are moved to the R position, leverage applied alternately to the end of handle 75 as just described will cause all actions described to be reversed, thus causing the whole assembly to move away from the handle 75 or in the reverse or opposite direction to that just described.

FIG. 5 traces the motion of such assembly as viewed from above as the operating handle 75 is alternately moved from left and right in which the assembly moves in the direction of the handle 75 or forward with both directional control arms 25 moved to the F or forward position. More specifically, in FIG. 5, with both directional control arms 25 set in the forward F position, neither wheel 5 can rotate in the reverse direction while each wheel is free to rotate clockwise causing the assembly to move forward in the direction of the handle 75. Therefore, as the handle 75 is moved to the right, the right wheel 5 is prevented from moving back as the left wheel 5 is free to move forward causing the whole assembly to move in a forward direction. As the handle 75 is moved to the left, the left wheel 5 is prevented from moving back as the right wheel 5 is free to move forward. The amount of distance that the whole assembly moves forward on each motion of the handle 75 depends upon how far the handle is swung in one direction more than in the other direction. Thus the path of point P to which a trailer jacking post as shown in FIG. 6 or hitching device may be attached will move in any desired direction as depicted by point P in FIG. 5.

To reverse the path of point P in FIG. 5 so that the assembly will move away from the handle by alternate swing motions of the handle 75 from left and right, the control arms 25 on both wheels must be moved to the reverse or R position.

When the control arms 25 are moved to the F position, the assembly may be moved forward by pulling on the handle 75 instead of swinging the handle 70 from left and right. Similarly, with both control arms 25 in the R position, the assembly may be removed in the reverse direction by pushing on the handle 75 without swinging the handle 75 in a left and right direction. When both control arms 25 are in the neutral N position, the assembly may be pushed or pulled freely in either direction. When the control arm 25 on one wheel 5 is set in the F position and the control arm 25 on the other wheel 5 is set in the R position, the assembly may be used to prevent movement of a trailer to which it is attached from moving down slight inclines when the trailer is in a parked position.

To facilitate operation of the assembly from either side when a bumper on a towing vehicle interferes with proper motion of the handle 75 from the front operating handle or, eye bracket 65 may be rotated 90 degrees to either side of the position shown in exploded view FIG. 9 by loosening the wing nut 67, then raising eye bracket 65 so that dowel pins 70 clear holes 63 in bracket 60. Eye bracket 65 may then be turned left of right as depicted by 65' in FIG. 9 and lowering bracket 65 so that dowels 70 are inserted into holes 64 in bracket 60. Eye bracket 65 can be secured in position '65 by tightening wing nut 67 for operating the assembly by oscillating the handle 75 from either side.

From the foregoing, it can readily be seen that by equipping a conventional warehouse hand truck, a two-wheeled construction wheelbarrow or any other such two-wheeled device with a bi-directional control arm on each wheel, the device will move forward or toward the operator when the handles are oscillated from side to side with the control arms 25 in the F position or away from the operator when the control arms 25 are moved into the R position. When both control arms 25 are moved to the neutral N position, the device can be operated in the conventional manner. Another particularly useful application of the present invention is for hand operated trailer movers as shown in FIG. 10 which are often used for manually moving trailers in storage yards and marinas and the like. Such devices require a considerable amount of manual force to move trailers in the conventional manner. Only a fraction of the manual effort is required to move a trailer with a trailer mover equipped with bi-directional control arms 25 as shown in FIG. 10.

For example, a trailer or two-wheeled hand truck that may require a 200 pound pulling force by an operator using a conventional trailer mover or a hand truck up an inclined ramp, will require a side to side force of only about 38 pounds on handles 48 inches long and wheels spaced 18 inches apart to move the same load.

Figure 7:
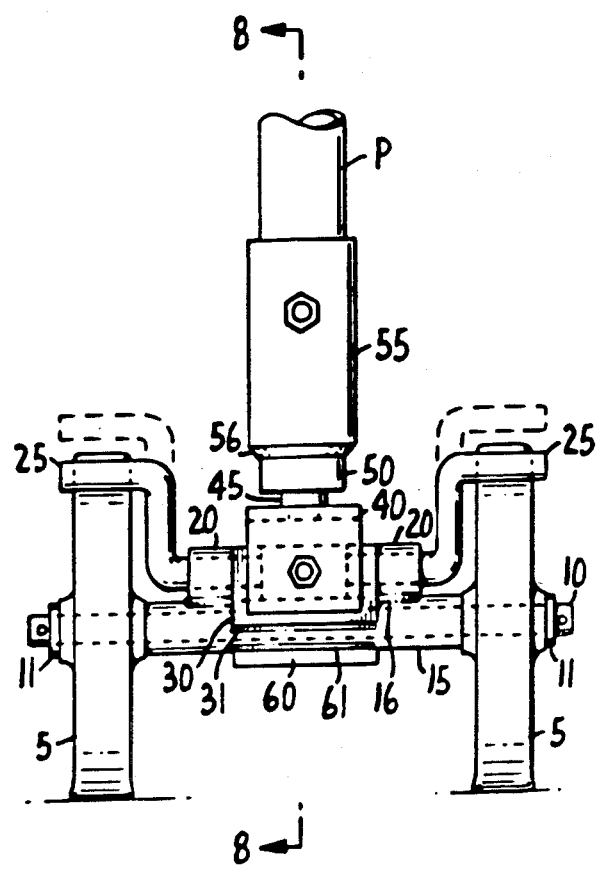
FIG. 7 is a side elevation of the wheel and axles with uni-control arms mounted between the wheels and the pivot bar, vertical pivot pin and manipulating arm control assembly shown.

As heretofore mentioned, FIG. 6 is a schematic side elevation of a boat trailer intended for attachment by a trailer hitch ball socket device G to engage a ball hitch B on an automobile or the like for towing wherein the wheel assembly of the present invention is employed. FIG. 7 is a front elevation of the wheel assembly shown partly in section looking in the direction of arrow 7—7 of FIG. 6. It will thus be noted that jack post P in engagement with socket 55 of the present invention can be adjusted vertically by a hand crank E on the jacking mechanism to raise or lower the trailer hitch 'G' to the desired elevation with respect to the ball B' on the towing vehicle. With the hitching device G elevated slightly over the ball B, the trailer can be manipulated as previously described into hitching device on the trailer directly over the ball B on the towing vehicle whereupon, the socket G is lowered into engagement with the ball B by means of the adjustable jack crank 'E'. Similarly, a trailer may be disengaged from the towing vehicle by reversing the procedure described for engagement after which the trailer may be manipulated away from the towing vehicle as desired. It should be noted that only one person using the present invention can easily move trailers and the like for hitching engagement to or for disengagement from a towing device with very little effort compared with conventional means to accomplish the same objective requiring more than one person.

It is to be noted that the crank arm means used for locking the rotation of wheels, as heretofore stated, is manually operable and thus can be turned by hand by the operator to the positions required for controlling the desired direction of rotation.

Figure 11:
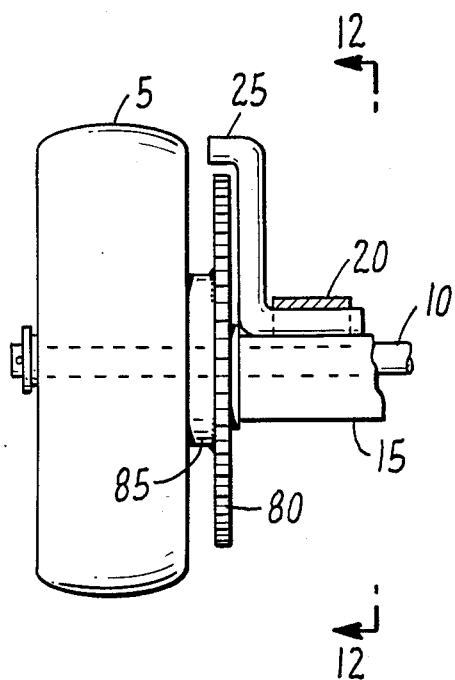
FIG. 11 is a partial view in side elevation of another embodiment of the uni-control directional control means of this invention as mounted on a wheel.
Figure 12:
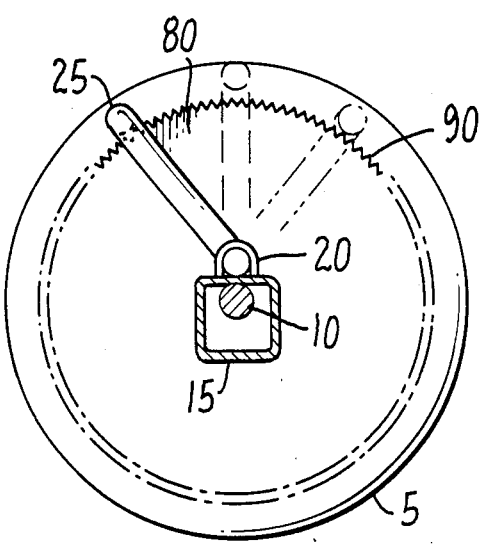
FIG. 12 is an end view partly in section of the wheel of FIG. 11 taken along the lines 12—12 thereof in the direction of the arrows.

Another advantageous embodiment of the invention is shown in FIGS. 11 and 12 of the drawings. In this arrangement wheel 5 is mounted on axle 10 within housing 15 in the same manner as the embodiment disclosed in FIG. 1. Also, radial crank arm 25 is disposed at its pivotal axis end in housing 20 which is affixed to and mounted on housing 10 so that the axis of area 25 is parallel to axle 10. The main feature of this embodiment is that a ratchet wheel 80 is fixedly attached by a hub arrangement or similar means 85 so as to be spaced from, but adjacent to, the inner side of wheel 5, and thus mounted thereon. The ratchet wheel 80 and hub 85 may be affixed to each other and to wheel 5 by welding, or bolts, or any other suitable means, which will insure that the ratchet wheel 80 rotates and is integral with wheel 5.

Ratchet wheel 80 and crank arm 25 which is disposed so that its horizontally extending section is adjacent to top of the notches of ratchet 80 and extends over them. Accordingly, crank arm 25 functions as the pawl for ratchet wheel 80. When arm 25 is in the vertical position (see FIG. 12) wheel 5 is free to rotate; however, when crank arm 25, which may be notched, is moved to the right or left about its axis the opposite end thereof contacts the notches of ratchet wheel 80 and can thus be adjusted to prevent the rotation of ratchet 80 and serve as braking means for wheel 5, and thereby control the direction of wheel 5 or the two wheels of the wheel assembly in the same manner as heretofore described in the embodiment of FIG. 1.

Figure 13:
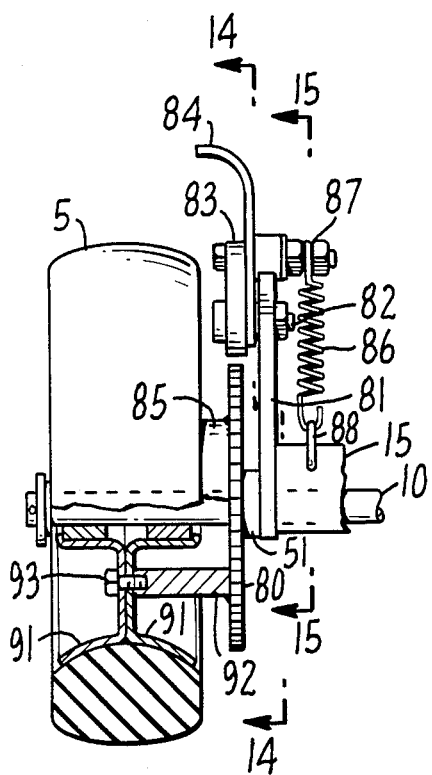
FIG. 13 is a partial view in side elevation of still another embodiment of the uni-control directional control means of this invention as mounted on a wheel.
Figure 14:
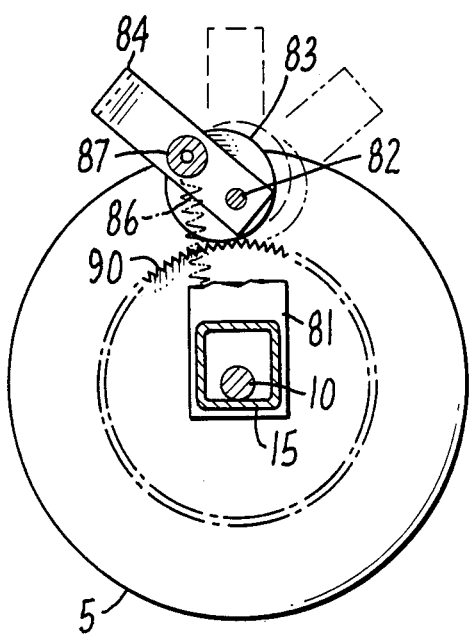
FIG. 14 is an end view partly in section of the wheel of FIG. 13 taken along the lines 14—14 thereof and looking in the direction of the arrows.
Figure 15:
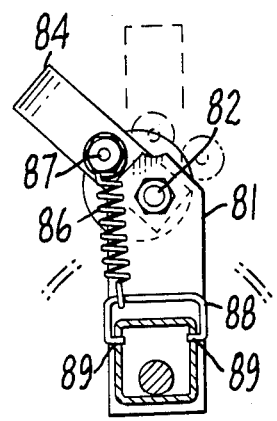
FIG. 15 is an end view partly in section of the wheel of FIG. 13 taken along the lines 15—15 thereof and looking in the direction of the arrows.

Still another useful embodiment is disclosed in FIGS. 13, 14 and 15 of the drawings wherein a similar ratchet wheel is employed with a modified hub mounting and wheel design. More specifically, wheel 5 includes recessed inner and outer sections 91, adjacent at a point the rim of wheel 5. Sections 91 are so that bracket 92 extending from ratchet spaced from the hub section 85 can be permanently mounted by bolts 93 or the like so as to insure an integral mounting for the ratchet wheel 80 to rotate with the wheel 5. Modified axle housing 15' has a spring actuated cam braking mechanism associated with it and attached to the upper end of upright bracket 81 extending from housing 15' and connected to bracket 81 by bolt or pivot pin means 82. Eccentrically mounted wheel 83 is also attached to bracket 81 by pivot pin 82 and is mounted in the same radial plane as ratchet wheel 80 and immediately above it. Thus, wheel 83 may pivot about pin 82 (see FIGS. 14 and 15) and function as a cam along with cam follower or lever 84 also mounted on pin 82. Means are provided in the form of tension spring 86 to maintain the lever 84 in a fixed position after it is moved. The upper end of spring 86 is attached to lever 84 at 87 in a pivotal arrangement and at its lower end spring 86 is slidably connected to handle 88 (see FIG. 15) which is anchored at each of its ends 89 by attachment to housing 15. By movement of the follower 84 to an upright vertical position or to a tilted position as shown in FIG. 14, both directly and in outline, the notched (not shown) wheel or cam 83 may be lowered to make contact with the teeth or notches 90 of ratchet wheel 80. By selective application of cam follower 84 the wheel rotation can be restricted by selective adjustment of lever 84 to enable wheel 83 to engage or release ratchet wheel 80 to prevent rotation or release wheel 5.

The device as described above is applicable in moving all types of loads and apparatus, such as trailers, hand trucks, warehouse trucks, pallet lifters, wheel barrows, etc. The principle causing the motion is identical. Since the object of the device when used on trailers is to manipulate the trailers to the hitch ball on the towing vehicle or to move the trailer away from the towing vehicle or to move the trailer into and out of tight places, it should be used primarily on level or slightly inclined surfaces.

While the uni-directional device just described is a useful means for controlling motion of the invention in a forward or reverse direction, other uni-directional control devices such as ratchet and pawls as shown in FIGS. 11 and 12 in one embodiment, and FIGS. 13, 14 and 15 in another embodiment thereof, may be attached to each wheel to prevent rotation of the wheel in one direction while permitting free rotation in the other direction and vice versa. The resulting motion of the wheel assembly will be as previously described when the handle attached to the assembly is oscillated from side to side.

We claim:

1. Tow-hitch apparatus for manually moving trailers, vans and other mobile carriers intended for moving heavy loads along flat and inclined surfaces with substantially reduced power and increased maneuverability comprising:
   a wheel assembly having a pair of spaced apart traction wheels each of which is mounted on opposite ends of a common axle,
   a tubular housing arranged about and supporting said common axle,
   a pair of control arm support means each independently mounted on a common fixed axis parallel to said common axle,
   separate braking elements each comprising a control arm pivotally mounted on said fixed common axis and within each said control arm support means for restraining rotation of each said wheel by frictional engagement when said control arm is pressed firmly thereagainst,
   a relatively long lever handle attached to said apparatus through which a horizontal oscillating force can be applied,
   and means for pivotally attaching said handle to said apparatus to enable said mobile carrier to move when said oscillating force is applied alternately to said lever handle so that the first of said wheels moves in a given direction about a radius the axis of which approximates the location of said second wheel until said first wheel reaches a desired point and said second wheel is then moved in said given direction about a radius the axis of which is approximately the location of said first wheel.

2. Tow-hitch apparatus for manually moving trailers, vans and other mobile carriers intended for moving heavy loads along flat and inclined surfaces with substantially reduced power and increased maneuverability comprising:
   a wheel assembly having a pair of spaced apart traction wheels each of which is mounted on opposite ends of a common axle,
   a tubular housing arranged about and supporting said common axle,
   control arm support means mounted on and above said tubular axle support housing to provide an axis for pivotal movement of a pair of uni-directional crank-shaped control arms arranged to pivot on an axis in alignment with and above said common axle,
   each of said crank-shaped control arms extending outward from its axis toward said wheels and each having an intermediate portion at right angles to each said pivotal axis thereof and a length that extends toward the periphery of each of said wheels,
   an opposite end portion of each said control arm parallel to said pivotal axis portion thereof and extending toward each said wheel,
   braking means associated with each said wheel for restraining rotation thereof by frictional engagement when said opposite end portion of each said crank-shaped control arm is pressed firmly against said brake means,
   and means for pivotably attaching said handle to said apparatus to enable said mobile carrier to move when said brake means are applied to a wheel and said oscillating force is applied alternately to said lever handle so that the first of said wheels moves in a given direction about a radius the axis of which approximates the location of said second wheel until said first wheel reaches a desired point and said second wheel is then moved in said given direction about a radius the axis of which is approximately the location of said first wheel.

3. The apparatus of claim 2 wherein said braking means frictionally engaging each said control arm comprises the outer surface of each said wheel.

4. The apparatus of claim 1 wherein the position of each said control arm can be manually adjusted to disengage said wheel when said control arm is in a vertical position and to engage said wheel when said control arm is positioned to the right or left of said vertical control arm position.

5. The braking means of claim 2 wherein each said control arm mounted on said bracket means includes an intermediate shaft portion extending radially therefrom and an upper arm portion extending outwardly therefrom in a plane parallel to said axle of said wheel assembly and spaced slightly above said wheels when said intermediate shaft portion is in a vertical radial position and thereby having a radius shorter than the radius of each of said first and second wheels whereby rotation of each said wheel in a particular direction can be arrested by braking due to frictional engagement with each said wheel when said crank arm is rotated from its vertical position to contact said wheels.

6. The apparatus of claim 1 wherein said braking means for frictionally engaging each said control arm comprises a pair of ratchet wheels, each mounted adjacent to and in the same plane as an associated traction wheel for rotation therewith, and wherein each said radically extending crank-shaped arm serves as a pawl for each said ratchet wheel for manual pivot to disengage said wheel when said control arm is in a vertical position and to engage said ratchet wheel when said control arm is positioned to the right or left of said vertical control arm position.

7. The apparatus of claim 1 wherein said braking means for each said wheel comprises:
a ratchet wheel affixed to and rotatable with each said wheel,
an upright bracket extending vertically from said axle housing to a point above said ratchet wheel,
an eccentric wheel cam pivotally mounted on said bracket,
a lever cam follower pivotally mounted on said bracket and connector to said wheel cam and having tension spring means pivotally mounted thereon,
said lever cam being mounted to permit said wheel to rotate freely when said lever is in a neutral vertical position and to cause said cam wheel to engage said ratchet wheel when moved to the right or left thereof to prevent rotation of said wheels and thereby provide independent braking means for each said wheel.

8. The apparatus of claim 1 wherein said long lever handle attached to said axle housing comprises;
an upright vertically extending shaft attached at the lower end thereof to support means therefor mounted midway across the length of said axle housing,
said vertical shaft having pivoted connecting means at the upper opposite end thereof adapted for attachment to cooperating attachment means on said mobile carrier to thereby provide a swivel connection between said tow-hitch apparatus and said mobile carrier.

9. Apparatus for manually moving mobile carriers such as trailers for animals, small boats, hand trucks and the like comprising,
a pair of wheels mounted on opposite ends of a common axle,
a tubular housing arranged about and supporting said common axle,
control arm support means mounted on and above said tubular axle support housing to provide an axis for pivotal movement of a pair of uni-directional control arms arranged in horizontal alignment with and above said common axle,
each of said control arms extending outward from its axis toward said wheels and each having an intermediate portion at right angles to each said pivotal axis, having a length that extends above the top of each of said wheels when said intermediate portion of each said control arm is in a vertical position with respect to said common axle,
an opposite end portion of each said control arm parallel to said pivotal axis portion thereof and extending over and contacting each said wheel when said control arms are turned about said pivotal axis thereof to thereby restrain rotation of said wheels in a clockwise or a counterclockwise direction.

10. The braking means of claim 9 wherein each said control arm mounted on said bracket means includes an intermediate shaft portion extending radially therefrom and an upper arm portion extending outwardly therefrom in a plane parallel to said axle of said wheel assembly and spaced slightly above said wheels when said intermediate shaft portion is in a vertical radial position and thereby having a radius shorter than the radius of each of said first and second wheels to arrest rotation of each said wheel in a particular direction by braking due to frictional engagement with each said wheel when one of said crank arms is rotated from its vertical position to contact said wheels.

11. The braking means of claim 9 wherein the means for controlling the rotation of each of said wheels comprise separate crank-shaped control arms which contact each said wheel.

12. The apparatus of claim 9 wherein a bracket plate support is connected to and extends forward from said tubular axle housing,
and a pivotally mounted operating handle converted to said bracket plate for controlling movement of said apparatus.

13. The apparatus of claim 9 wherein the position of each said uni-directional crank arm can be manually adjusted toward or away from each said wheel.

14. Tow-hitch apparatus for manually moving trailers, vans and other mobile carriers intended for moving heavy loads along flat and inclined surfaces with substantially reduced power and increased maneuverability comprising:
a wheel assembly having a pair of spaced-apart freely rotatable wheels, each of which is mounted at opposite end of a common axle,
a housing encircling said common axle,
an upright vertically extending shaft attached at the lower end thereof to support means therefor mounted midway across the length of said axle housing,
said vertical shaft having pivoted connecting means at the upper opposite end thereof adapted for attachment to cooperating attachment means on said mobile carrier to thereby provide a swivel connection between said tow-hitch apparatus and said mobile carrier,
adjustable handle means for attachment to second support means mounted on said axle housing,
separate brake means for each of said wheels that can be applied to said wheels independent of each other to restrict rotation of each wheel in a forward or a rearward direction or permit free rotation thereof regardless of the movement or restricted movement of the other wheel, each of said brake means comprises a crank-shaped rod having an intermediate section generally at right angles to parallel sections of rod extending in opposite directions from each end of said intermediate section, one side end rod section being mounted above and parallel to said axle housing and to serve as the horizontal axis for said crank area upon rotation thereof and the other said end rod section extending outward over one of said wheels, the length of said intermediate rod section being sufficient when perpendicular to said axle housing to extend above said wheel and to rest upon said wheel when rotated to a vertical position within said rod support means, and to cause said outward extending rod section to contact the outer surface of said wheels when rotated within said rod support means to thereby provide a braking effect due to frictional engagement on a particular wheel when said mobile carrier is moved in the direction of rotation of said contacting outer rod section to thereby enable the direction of said mobile carrier to be controlled.

* * * * *